A. RUELLAND

Sept. 6, 1932. ELECTRIC IRON Re. 18,592

Original Filed April 15, 1921

WITNESSES

W. G. Jones

Robert J. Hulsizer

INVENTOR

ALBERTINE RUELLAND

BY Munn & Co

ATTORNEYS

Reissued Sept. 6, 1932

Re. 18,592

UNITED STATES PATENT OFFICE

ALBERTINE RUELLAND, OF NEW YORK, N. Y.

ELECTRIC IRON

Original No. 1,563,591, dated December 1, 1925, Serial No. 461,598, filed April 15, 1921. Application for reissue filed April 1, 1932. Serial No. 602,610.

This invention relates to electric irons. An object of the invention concerns the provision of an electric iron which is adapted to efficiently iron materials of delicate texture, such as velvets, satins, crepes, chiffons, etc.

Another object of the invention resides in the provision of an iron which can be used as any ordinary iron, and which is, at the same time, provided with means whereby it is particularly adapted for the ironing of the above-mentioned materials with a minimum liability of injury to the hands or person of the operator.

A further object resides in the particular construction and arrangement of parts which are hereinafter described and claimed and shown in the accompanying drawing.

In the operation of ironing delicate fabrics, such as satins, crepes, chiffons, velvets, etc., it is a well-known fact that it is impossible to iron these materials except by running an iron over one face of the material. If, therefore, the material were placed on an ironing board or other surface in the usual manner, with this face upward, then the other face, which is of the most importance when the material is made into a dress or other garment, would be marred or injured by the pressure of the iron and by contact with the supporting surface. Therefore, in order to avoid this injury, it has been heretofore customary to iron such surfaces on the desired face by merely running the iron over the surface while the garment or the fabric is supported from some suitable point. In the use of the ordinary iron, this operation requires that the iron be held in such an awkward and inconvenient manner that oftentimes the operator burns the hands.

My invention in general involves the provision of an iron electrically heated and of a suitable form and construction which is provided with a handle portion suitably attached thereto which is disposed in a plane apart from the plane of the heated surface and is adapted to swing around in this plane and be adjusted in any position with respect to the body portion of the iron. This possible rotation of the handle portion permits it at times to extend in a direction away from the body portion, and at other times to extend in a direction over the body portion. In the first extended position of the handle, the handle can be gripped to manipulate the iron and, at the same time, the heating surface of the iron is at a maximum distance from the hand, whereby injury will not result from the operation of the iron in the manner above described. When the handle is swung in the other direction, to extend over the body portion, the handle can be gripped and the iron used as an ordinary iron with the application of any desired pressure thereto.

The invention is illustrated in the drawing of which:

Figure 1:
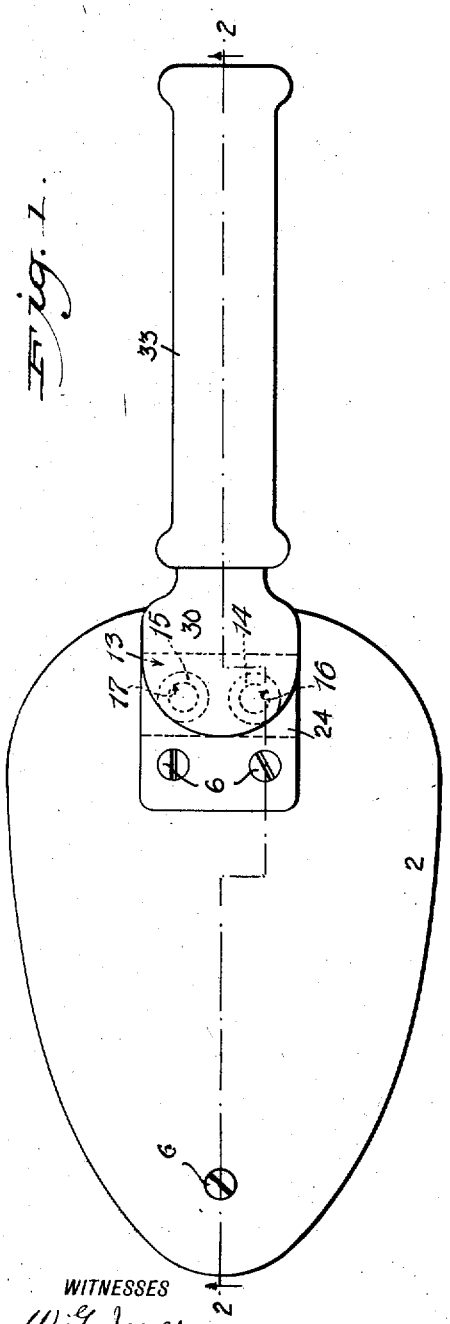
Figure 1 represents a plan view of the iron.

The preferred form of my invention, as shown in the drawing, comprises an iron of any suitable size, weight or form, preferably somewhat of the form shown in the drawing, which comprises a body portion having a lower section 1 and an upper section 2. The lower section 1 is provided with a heating surface such as 3. Both portions of the body portion, particularly the lower part, may be made of any suitable metal, such as steel or cast iron, as desired. The characteristics or qualities of the material of which the body portion may be made is determined by the working conditions and requirements desired of the iron. For convenience, the lower half 1 of the body portion will be called the heating portion, and the upper half 2, will be called the cover portion, although other terms could be used in connection therewith. The heating portion is provided with a recess, such as 4, in which a heating coil or resistance wire of any desired quality is disposed. This heating unit 5 is supported within and from the body portion of the iron in any well-known manner as circumstances may designate. The cover portion of the iron is fastened to the heating portion by means of screws, such as 6. These screws are adapted to extend through suitable apertures in the cover portion and into apertures in bosses 7 and 8 suitably formed on and extending upwardly from the heating portion 1 of the iron. The cover portion 2 and the heating portion 1 are provided with cooperating engaging shoulders which interlock with each other and hold the cover portion on the head portion. The contacting faces of these shoulders are represented by the numerals 9 and 10, in the figures. The cover portion is also provided with a suitable recess, such as 11, adapted to receive the boss 8, above mentioned. Above a portion of this boss 8 the cover portion is cut away in the form of an aperture 12 in which is located a porcelain block such as 13. This block is mentioned as being made of porcelain but any other suitable insulating material may be used. The porcelain block is provided with a pair of apertures or bores 14 and 15 which, when the block is in the recess 12 of the cover 2, align themselves with similar apertures such as 16 and 17, in the top of the boss 8. These apertures 16 and 17, in the top of the boss 8, are lined with some suitable insulating material represented by the numeral 18. This insulating material is bored out to receive the lower threaded ends of binding posts such as 19. Insulating washers 20 are disposed on the upper surface of the boss 8 around the binding posts 19 and above these washers the ends, such as 21, of the heating unit or wire 5 are disposed in contact with the binding posts 19. Suitable adjusting and binding nuts 22 are threaded on the binding posts 19 and terminal wires, such as 26, are connected thereto in any well known manner.

On the top of the cover portion adjacent the insulating block 13 there is disposed a base portion, such as 24. This base portion provides a suitable support for a handle 25. The base portion is provided with apertures through which certain of the above mentioned screws extend. The base portion is also provided with a downwardly projecting flange portion 26, which extends along the rear edge of the cover portion and which is connected thereto by suitable screws 27. On its upper face base portion 24 is provided with an exteriorly threaded projecting boss 28. The electrical heating element is disposed within the body portion, substantially beneath the boss 28. This boss is bored at 29 to permit of the passage of the terminal wires 23 therethrough. Part of the handle, in the form of an elbow portion 30, is bored as at 31 throughout its length, and at its end is interiorly threaded to be received on boss 28. The main body portion of the handle is in the form of a horizontally extending portion 32 hollowed out to permit of the passage of the terminal wires above mentioned and provided with an embracing sleeve 33, which may be of any suitable material, such as wood. The base portion 24 and the elbow portion 30, including the handle portion 32, may be made of any suitable material, such as nickel steel.

Figure 2:
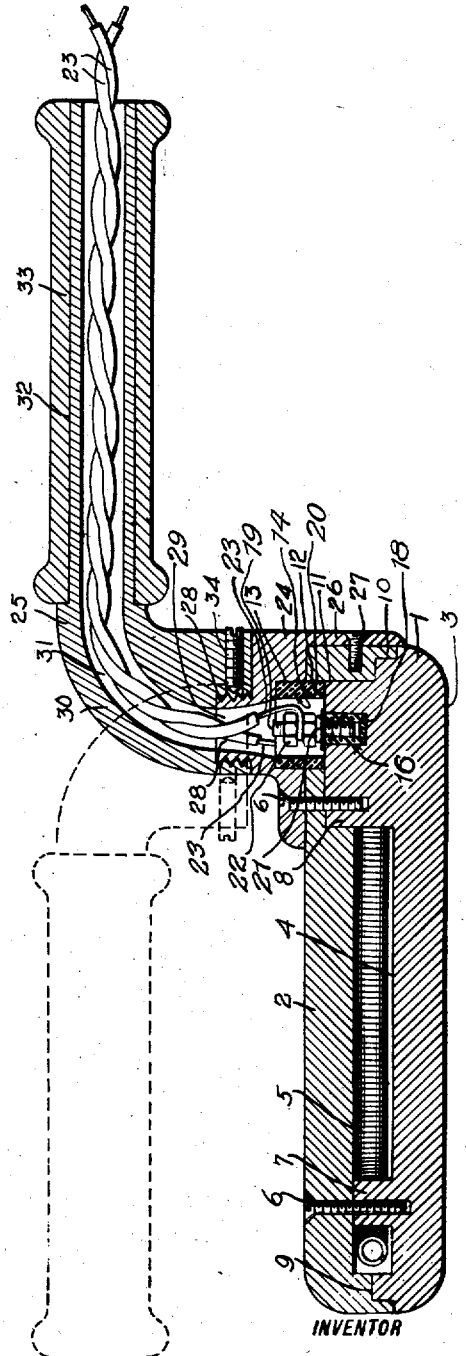
Figure 2 is a vertical longitudinal section taken through the iron and the handle.

In order to adjust the handle portion in any desired position with respect to the base portion 24, and, also, the body portion of the iron, I, preferably, provide a bore 34 extending into the side of elbow portion 30 in which is disposed a set screw 34, the inner end of which is pointed and adapted to engage with the threads on the boss 28 so as to secure the elbow portion in any desired position with respect to boss 28. In the position shown in Figs. 1 and 2, the handle portion, by reason of the elbow, is adapted to extend in any direction in a plane parallel with and above the plane of the heating surface 3. As shown in full lines in Figs. 1 and 2, the handle portion extends in this plane in a direction rearwardly from the body portion. In this form and position of the handle portion, the handle is adapted to be gripped and to be used to press out and iron the delicate fabrics above mentioned with a minimum liability of injury to the hands of the operator, since the heating surface, as will be observed, is disposed at a maximum distance from the hands of the operator. However, under certain circumstances, it may be desirable to use this iron in the manner in which an iron is ordinarily used. When this is the case, it is merely necessary to release the set screw and move the handle around to the position shown in dotted lines in Fig. 2, and then tighten the set screw. In this position the handle extends from one end of the body portion over the remaining part of the body portion, so that the iron can be used in the ordinary manner.

I have illustrated certain forms and arrangements and have mentioned certain materials of which the various parts of the iron above described are made, but it is understood that other desirable forms and arrangements and materials can be used in accordance with the circumstances under which the iron is to be used, and that different sizes, shapes and weights of the parts can be adopted at will.

What I claim is:

1. An electric iron comprising a body portion, a heating element within the body portion, a hollow boss disposed on the rear upper surface of the body portion, terminals for the heating element, said element being disposed within the body portion substantially beneath the boss, a hollow handle provided with an elbow engaging the boss, circuit wires extending through the handle and engaging with the terminals, and means for adjusting the handle in a plurality of positions with respect to the body portion.

2. An electric iron which comprises a body portion, an adjustable hollow elbow connected to the upper rear end of the body portion, and a hollow handle portion connected to the free end of the elbow and adapted to extend rearwardly of the body portion in one position of the elbow and electric circuit wires carried in protective relation within said handle.

3. An electric iron which comprises a body portion, a threaded boss on the body portion, a handle having threaded engagement with the boss to permit adjustable positioning of the handle thereon and a set screw on the handle disposed in a bore therein, said set screw adapted to be adjusted to engage with the threads on the boss to lock the handle in any desired position.

4. An electric iron comprising a body portion with a boss on its rear upper surface only, a handle having a substantially straight grip portion, a rotary connection between one end of the handle and said boss, spacing the handle in a plane apart from the plane of the body portion and enabling the handle to be turned in its plane to different working positions, the handle in one position extending rearwardly of the body portion so that it can be gripped at a substantial distance from the body portion, and in another position extending directly over the body portion, and a device for fixing the handle to the boss for use in said positions, the handle being supported only by its connection at one end with said boss.

In testimony whereof, I have signed my name to this specification.

ALBERTINE RUELLAND.